July 17, 1956 E. D. DAHLMAN 2,754,983
MATERIAL HANDLING AND SELF-UNLOADING VEHICLE
Filed Feb. 29, 1952 2 Sheets-Sheet 1
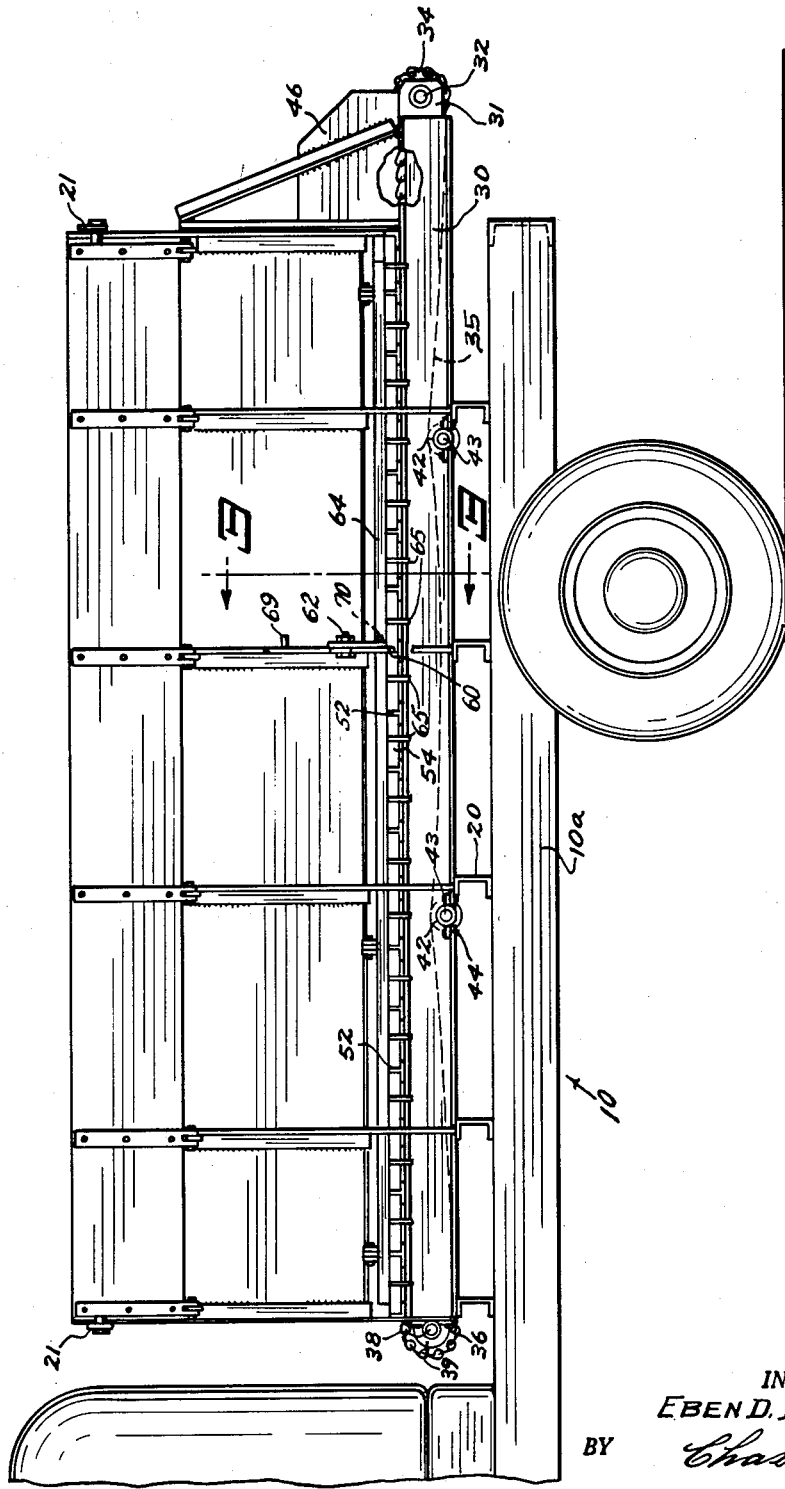
INVENTOR.
EBEN D. DAHLMAN
BY
Chas. C. Reif
ATTORNEY.

July 17, 1956  E. D. DAHLMAN  2,754,983
MATERIAL HANDLING AND SELF-UNLOADING VEHICLE
Filed Feb. 29, 1952  2 Sheets-Sheet 2
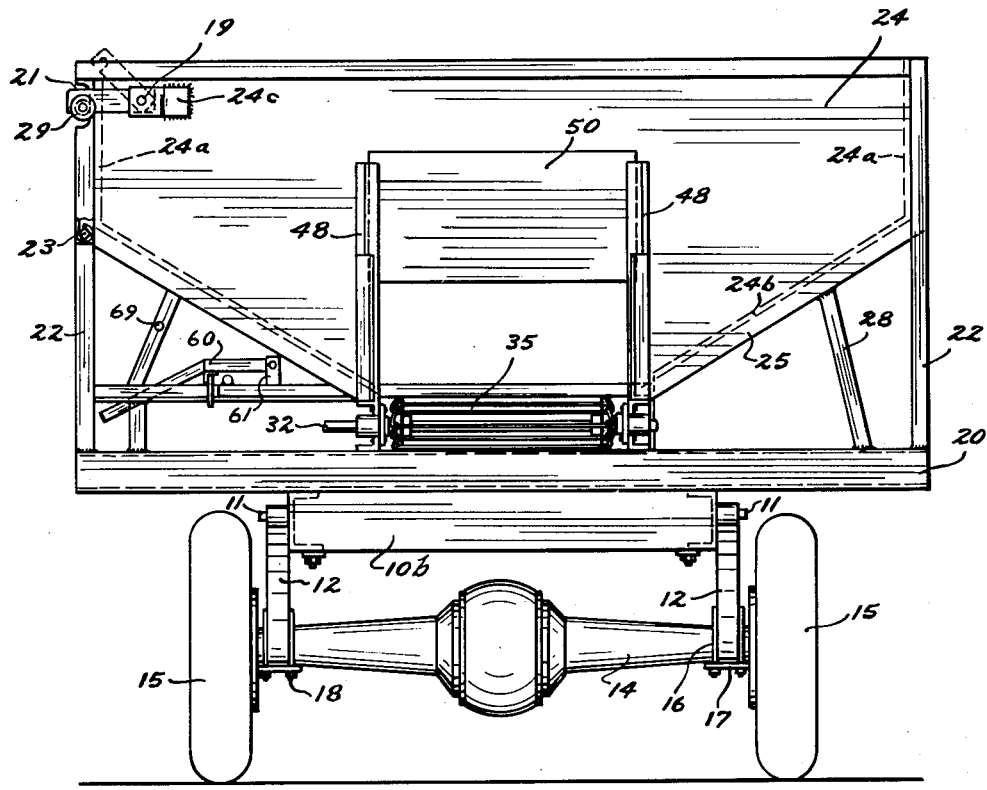
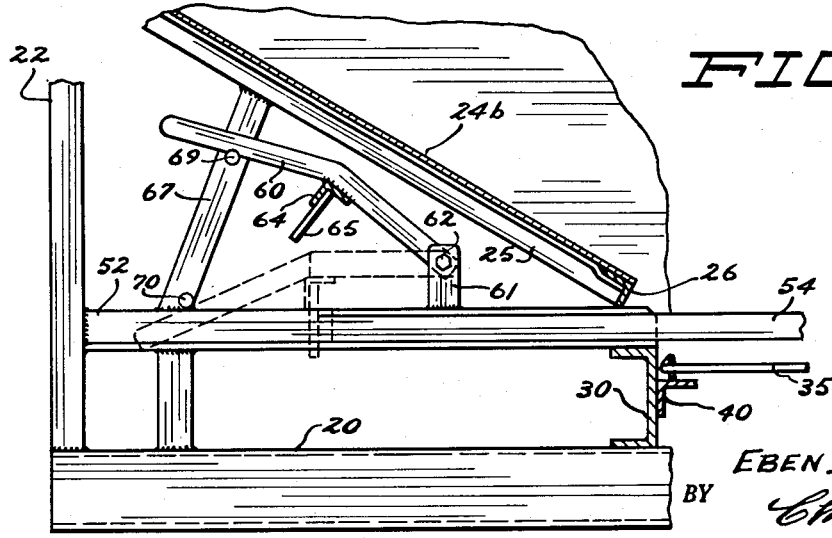
INVENTOR.
EBEN D. DAHLMAN
BY
Chas. C. Reyf
ATTORNEY.

United States Patent Office 2,754,983
Patented July 17, 1956

2,754,983

MATERIAL HANDLING AND SELF-UNLOADING VEHICLE

Eben D. Dahlman, Grandy, Minn., assignor to Dahlman Manufacturing Company, Braham, Minn., a corporation of Minnesota Application February 29, 1952, Serial No. 274,253

7 Claims. (Cl. 214—83.2)

This invention relates broadly to a transporting and unloading device, and while the same may have many applications, it has been designed and constructed specifically for handling potatoes. Potatoes are now harvested by machines and some of these machines comprise conveyors which harvest the potatoes and have discharging means so that the potatoes can be discharged into vehicles alongside said machine.

It is an object of this invention to provide a transporting and unloading device preferably adapted to be mounted upon a wheel-supported vehicle, said device comprising a box having an opening in its bottom, a conveyor movable below said opening and a plurality of planks extending transversely of said box and conveyor and forming the bottom of said box, said planks being freely and bodily removable endwise, together with means for preventing removal of said planks.

It is a further object of the invention to provide a potato-handling device comprising a box adapted to be mounted on a vehicle, said box having a bottom formed of a series of transversely extending planks, together with an endless conveyor which is moved longitudinally of the box beneath and adjacent said planks, said planks being individually and bodily removable endwise so that they can be successively removed, together with means movable to position to prevent removal of said planks and also movable to position to permit removal of said planks.

These and other objects and advantages of the invention will be fully set forth in the following description made in connection with the accompanying drawings in which like reference characters refer to similar parts throughout the several views and in which:

Fig. 1 is a view in side elevation of the device, some parts being broken away;

Fig. 2 is a view in end elevation looking at the discharge end of said device; with some parts shown in dotted line in different position; and Fig. 3 is a partial vertical section taken substantially on line 3—3 of Fig. 1, as indicated by the arrows, with some parts shown in dotted line in different position.

Referring to the drawings, a device is shown comprising a frame 10 illustrated as of rectangular form and comprising longitudinally extending side members 10a, and end members 10b, said frame being rectangular in plan. While said frame could be made of various materials, in the embodiment of the invention illustrated the same is shown as being made of channels having their flanges facing inwardly, said channels being preferably welded together. Frame 10 is provided with projecting pins or shafts 11 which are connected in any suitable manner to the springs 12 secured in turn to the differential housing 14 of an automotive vehicle. Said housing 14 carries axles on which are carried the supporting wheels 15 shown as equipped with pneumatic tires. Springs 12 are shown as connected by U-bolts 16 disposed at each side thereof, the same embracing the end portions of housing 14, extending through a plate 17 and being equipped with nuts 18.

A plurality of members 20 are supported upon and extend transversely of frame 10. While these members could take various forms, they are shown as channel members and the same are spaced along frame 10, as shown in Fig. 1. Secured to members 20 at each end thereof and extending vertically therefrom are members 22 shown as bars rectangular in cross section. As shown, bars 22 have their remote sides flush with the ends of members 20 and are connected to members 20 in any suitable manner, as by welding. The upper end portions of members 22 extend along the sides of a box 24 and are secured to the sides of said box in any suitable manner, as by welding. Box 24 has vertical side portions 24a at its upper portion and has downwardly and inwardly inclined walls 24b extending from portions 24a. The bottom of the box is reenforced by angle members 25 which are secured to the bottom of portion 24b and extend to and are secured to angle members 26 which extend longitudinally of portions 24b. The inner sides of angles 26 are flush with the inner ends of portions 24b and define an opening in the bottom of the box which extends between said parts. Box 24 has the portion 24a at one side thereof swingable outwardly on a pivot rod 23. Said portion is held in upright or closed position by hooks 21 swingable about pivots 19 secured in the ends of box 24 and lugs 24c secured thereto. Hooks 21 engage over headed studs 29 secured in the ends of box 24. Preferably brace members 28 extend from members 20 upwardly and inwardly to the members 25. Channel members 30 are supported upon members 20 below members 26, the same having their flanges facing upwardly. Said channels extend the entire length of box 24 and project some distance at the rear end thereof. Bearings 31 are secured to the rear ends of channels 30 and a shaft 32 is journaled in said bearings and extends therebetween. Sprockets 34 are secured to shaft 32 and an endless conveyor 35 runs over sprockets 34. Bearings 36 are secured to the front end of channels 30 in which is journaled a shaft 38 to which spaced sprockets 39 are secured and conveyor 35 runs over sprockets 39. While different forms of conveyors might be used, in the embodiment of the invention illustrated, conveyor 35 is formed by spaced transversely extending rods having their ends bent to be inter-engaged. One of the shafts 32 or 38 will be suitably driven by a motor carried on the device, which motor is not shown. The upper run of conveyor 35 moves on member 40 secured to the inner sides of channels 30. The lower run of conveyor 35 will be supported on spaced rollers 42 carried on shafts 43 journaled in bearings 44 secured to the channels 30.

A pair of plates 46 extend rearwardly from box 24 at each side of conveyor 35. A pair of spaced members 48 forming guideways are secured to the rear end of the box, and a tailgate 50 is slidable in members 48.

A considerable number of members 52 extend transversely of members 30 being supported thereon, and these members are illustrated as T-bars, the same having their central flanges vertical and directed upwardly. A plurality of planks 54 are supported on the horizontal flanges of bars 52 and extend between the vertical flanges thereof. Said bars 52 extend from the end or outer side of one of the channel members 30 across the other channel member 30 and outwardly to the vertical members 22. The planks 54 extend from one member 26 outwardly a considerable distance beyond the other member 26.

A lever 60 is provided shown as having its end portions at an obtuse angle, one of said end portions being pivoted to a bracket 61 supported by one of the T-bars 52. Said lever is pivoted upon a headed pin 62. A member 64 illustrated as an angle bar is secured to lever 60 and movable therewith. Member 64 has secured thereto in any suitable manner, as by welding, a number of pins 65, The pins 65 are spaced on member 64 so that they are aligned respectively with substantially the center of planks 54. Lever 60 is disposed close to a brace member 67 extending between one of the bars 52, and a member 25. Member 67 has spaced projecting pins 69 and 70 secured thereto. Lever 60 is so mounted that it can be moved laterally to be in line with pins 69 and 70 or to be free of the same.

In operation, the box 24 can be loaded with the desired material such as potatoes. Usually said box will be loaded from the side having the movable portion 24a. This portion 24a can be swung downwardly about the pivot 23 after being released from hooks 21. As the box becomes filled, said portion 24a will be swung to vertical position and be held in such position by the hooks 21. When it is desired to unload the box, tailgate 50 will be raised, as shown in Fig. 2, and conveyor 35 will be operated by starting its driving motor. The top run of conveyor 35 moves rearwardly. As the potatoes or other material diminish in height at the rear end portion of box 24, the planks 54 can be individually and bodily removed by sliding them endwise. When in position forming the bottom of box 24, said planks are prevented from moving outwardly by the pins 65. These pins substantially engage the outer ends of the planks, as shown in dotted lines in Fig. 3. The lever 60 at this time will be positioned below pin 70 so that the same will not move upwardly. When the planks are to be removed, lever 60 will be swung outwardly from pin 70 and swung upwardly to the full line position shown in Fig. 3. Lever 60 will be moved over the top of pin 69 and the pins will then be held in position with their ends above planks 54 so that the latter can be easily removed. As each successive plank is removed, the potatoes or other material in box 24 can drop down on conveyor 35 and be discharged at the rear end thereof.

From the above description it is seen that I have provided a comparatively simple and very efficient device for the rapid handling of material. The material, such as potatoes, can be loaded into the box 24 and then transported to the desired location. The material can then be quickly discharged, as above described. It has been the previous practice to have the potatoes placed in bags as they are discharged from the picking machines. If the potatoes are to be placed in a warehouse the bags must then be transported to the warehouse and emptied therein. By use of the present device the bagging of the potatoes is entirely eliminated. The potatoes are delivered laterally from the picker into the box 24 and can then be rapidly transported to the warehouse and discharged therein. The device has been amply demonstrated in actual practice, found to be very successful and efficient, and is being commerecially made.

It will of course be understood that various changes may be made in the form, details, arrangement and proportions of the parts, without departing from the scope of applicant's invention, which generally stated, consists in a device capable of carrying out the objects above set forth, in the parts and combinations of parts disclosed and defined in the appended claims.

What is claimed is:

1. A vehicle box structure adapted to be supported upon a wheel-supported frame of a highway vehicle having in combination, a second frame adapted to be supported by said frame and comprising a pair of laterally spaced longitudinally extending members, a box supported by said second frame having side walls and an opening therebetween at the bottom thereof, an endless conveyor having a top run extending from end to end of said box below said opening and adjacent the same, a multiplicity of transversely extending planks of greater length than width lying in a single plane and supported above said longitudinally extending members above said top run of said conveyor and below said opening and forming the bottom of said box, said planks extending at one end quite a distance from said opening and being individually slidable and freely removable manually endwise so that the material in said box may be progressively discharged onto said conveyor, said planks being individually reinsertable endwise manually by a sliding movement and means extending longitudinally along one side of said box for engaging said planks adjacent their ends to prevent endwise movement thereof.

2. A vehicle box structure adapted to be supported upon a wheel-supported frame of a highway vehicle having in combination, a second frame adapted to be supported by said frame and comprising a pair of laterally spaced longitudinally extending members, a box supported by said second frame having side walls and an opening therebetween, an endless conveyor having a top run extending from end to end of said box closely below said opening, a multiplicity of transversely extending planks lying in one plane supported above said longitudinally extending members above said top run of said conveyor and below said opening and forming the bottom of said box, said planks being extended at one end and being individually slidable and freely removable endwise manually so that they are entirely free and separated from said structure and the material in said box may be progressively discharged onto said conveyor, means extending along one of said side walls and movable into position relatively to said planks adjacent the outer ends thereof to prevent their removal and movable to position to permit such removal at random, means for moving said last mentioned means, and means for holding said last mentioned means in said positions.

3. A vehicle box structure adapted to be supported upon a wheel-supported frame having in combination, a second frame adapted to be supported by said frame and comprising a pair of laterally spaced longitudinally extending members, a box supported by said second frame having side walls and an opening therebetween, an endless conveyor having a top run extending from end to end of said box below said opening, a multiplicity of transversely extending planks supported above said longitudinally extending members above said top run of said conveyor and below said opening and forming the bottom of said box, said planks having one of their ends projecting at one side of said box so as to be individually slidable and freely removable endwise manually so that the material in said box may be progressively discharged onto said conveyor, a member swingable toward and away from said projecting ends of said planks, said ends being grasped for removing said planks, means carried by said last mentioned member arranged to be positioned in front of said planks when said member is swung toward said planks to prevent endwise removal of said planks.

4. A device of the class described having in combination, a box having an opening extending longitudinally thereof in its bottom, a multiplicity of planks supported just below said opening, extending transversely of said box and forming the bottom of said box, said planks being individually and bodily freely removable endwise manually, a lever pivoted at one end to swing about an axis extending longitudinally of said box, a member carried by said lever extending transversely of all of said planks and swingable toward said planks, means carried by said member movable to a position in front of said planks respectively to prevent said planks from being removed endwise.

5. The structure set forth in claim 4, and a member with which said lever is engageable for holding the same in position with said means in front of said planks.

6. The structure set forth in claim 4, and means for holding said lever in position with said means carried by said member and positioned away from the ends of said plank.

7. A device of the class described having in combination, a box having an opening extending longitudinally thereof in its bottom, a multiplicity of planks supported just below said opening, extending transversely of said box and forming the bottom of said box, said planks being individually and bodily freely removable endwise manually from said box, a lever pivoted at one end to swing about an axis extending longitudinally of said box, a member carried by said lever extending transversely of all of said planks and positioned to move toward said planks, and a plurality of spaced pins carried by said member positioned to be disposed closely adjacent the ends of said planks respectively to prevent endwise movement thereof.

References Cited in the file of this patent

UNITED STATES PATENTS

| | | |
|---|---|---|
| 669,876 | Critchlow | Mar. 12, 1901 |
| 1,124,825 | Whartnaby et al. | Jan. 12, 1915 |
| 1,211,601 | Larson | Jan. 9, 1917 |
| 1,270,085 | Wiltshire | June 18, 1918 |
| 2,029,297 | Peyton | Feb. 4, 1936 |
| 2,275,799 | Oklejas | Mar. 10, 1942 |
| 2,284,853 | Wall | June 2, 1942 |
| 2,520,291 | Wall | Aug. 29, 1950 |
| 2,552,953 | Gaddis | May 15, 1951 |